United States Patent
Zuyev et al.

(10) Patent No.: US 10,380,738 B2
(45) Date of Patent: Aug. 13, 2019

(54) COMPUTED TOMOGRAPHY IMAGE PROCESSING AND DATA ANALYSIS

(71) Applicant: ABBYY Development LLC, Moscow (RU)

(72) Inventors: Konstantin Zuyev, Moscow (RU); Aleksey Matyushin, Moscow (RU); Stepan Lobastov, Kirov (RU)

(73) Assignee: ABBYY Production LLC, Moscow (RU)

( * ) Notice: Subject to any disclaimer, the term of this patent is extended or adjusted under 35 U.S.C. 154(b) by 0 days.

(21) Appl. No.: 15/623,853

(22) Filed: Jun. 15, 2017

(65) Prior Publication Data
US 2018/0350066 A1 Dec. 6, 2018

(30) Foreign Application Priority Data
May 30, 2017 (RU) .................... 2017118740

(51) Int. Cl.
*G06K 9/00* (2006.01)
*G06T 7/00* (2017.01)
*G06T 7/11* (2017.01)
*G06T 11/60* (2006.01)

(52) U.S. Cl.
CPC ............ *G06T 7/0012* (2013.01); *G06T 7/11* (2017.01); *G06T 11/60* (2013.01); *G06T 2207/10081* (2013.01); *G06T 2207/10104* (2013.01); *G06T 2207/20084* (2013.01); *G06T 2210/22* (2013.01)

(58) Field of Classification Search
None
See application file for complete search history.

(56) References Cited

U.S. PATENT DOCUMENTS

| | | | |
|---|---|---|---|
| 5,723,697 A | 3/1998 | Bhinde et al. | |
| 6,058,322 A | 5/2000 | Nishikawa et al. | |
| 6,549,646 B1 | 4/2003 | Yeh et al. | |
| 6,775,405 B1* | 8/2004 | Zhu ................... | G06K 9/6212 345/419 |
| 8,577,129 B2 | 11/2013 | Reeves et al. | |
| 9,589,374 B1* | 3/2017 | Gao .................. | G06T 11/008 |
| 2008/0892194 | 11/2008 | Schmidt et al. | |
| 2010/0198054 A1 | 8/2010 | Ewing et al. | |
| 2011/0243417 A1* | 10/2011 | Madabhushi ....... | G06K 9/3233 382/131 |
| 2013/0077891 A1* | 3/2013 | Nimnual ............ | G06T 3/0068 382/276 |
| 2016/0364862 A1 | 12/2016 | Reicher et al. | |
| 2018/0150598 A1* | 5/2018 | Kohls ................ | G06F 19/321 |
| 2018/0165305 A1* | 6/2018 | Wang ................ | G06F 17/30256 |

* cited by examiner

*Primary Examiner* — Shervin K Nakhjavan
(74) *Attorney, Agent, or Firm* — Lowenstein Sandler LLP (57) ABSTRACT

Systems and methods for computed tomography image processing and data analysis. An example image may comprise: receiving a plurality of input images of a scanned body; processing, by a first convolutional neural network, the plurality of input images to produce one or more pseudo radioisotope emission (pseudo-RE) images of the scanned body; and processing, by a second convolutional neural network, the plurality of pseudo-RE images to classify one or more input images of the plurality of input images with respect to a specified medical diagnosis with respect to the scanned body.

22 Claims, 8 Drawing Sheets

FIG. 1

CT image 210

PET image 220

COMPUTED TOMOGRAPHY IMAGE PROCESSING AND DATA ANALYSIS

CROSS REFERENCE TO RELATED APPLICATIONS

The present application claims the benefit of priority under 35 U.S.C. § 119 to Russian Patent Application No. 2017118740, filed May 30, 2017; the disclosure of which is incorporated herein by reference in its entirety for all purposes.

TECHNICAL FIELD

The present disclosure is generally related to computer systems, and is more specifically related to systems and methods of computed tomography image processing and data analysis.

BACKGROUND

Computed tomography (CT) is an imaging procedure that uses specialized X-ray equipment to create detailed pictures, or scans, of areas inside a scanned object (e.g., a living body). Multiple X-ray images taken from different angles may be utilized to produce cross-sectional tomographic images (virtual "slices") of specific areas of the scanned object. Medical imaging is one of the most common applications of CT. The cross-sectional images are used for diagnostic and therapeutic purposes in various medical disciplines.

Positron emission tomography (PET) is a radioisotope emission (RE)-based imaging technique that detects pairs of gamma rays emitted indirectly by a positron-emitting radionuclide (tracer), which is introduced into the body on a biologically active molecule. Three-dimensional images of tracer concentration within the body are then constructed by computerized analysis.

Positron emission tomography-computed tomography (PET-CT) is an imaging technique which combines, in a single gantry, a PET scanner and an X-ray CT scanner, to acquire sequential images from both devices in the same session, which are combined into a single superposed image.

SUMMARY OF THE DISCLOSURE

In accordance with one or more aspects of the present disclosure, an example method of image processing and data analysis may comprise: receiving a plurality of input images of a scanned body; processing, by a first convolutional neural network, the plurality of input images to produce one or more pseudo radioisotope emission (pseudo-RE) images of the scanned body; and processing, by a second convolutional neural network, the plurality of pseudo-RE images to classify one or more input images of the plurality of input images with respect to a specified medical diagnosis with respect to the scanned body.

In accordance with one or more aspects of the present disclosure, an example system for image processing and data analysis may comprise a memory and a processor coupled to the memory, the processor configured to: receive a plurality of input images of a scanned body; process, by a first convolutional neural network, a plurality of input images of a scanned body to produce one or more pseudo radioisotope emission (pseudo-RE) images of the scanned body; and process, by a second convolutional neural network, the plurality of pseudo-RE images to classify one or more input images of the plurality of input images with respect to a specified medical diagnosis with respect to the scanned body.

In accordance with one or more aspects of the present disclosure, an example computer-readable non-transitory storage medium may comprise executable instructions that, when executed by a computer system, cause the computer system to: receiving a plurality of input images of a scanned body; processing, by a first convolutional neural network, a plurality of input images of a scanned body to produce one or more pseudo radioisotope emission (pseudo-RE) images of the scanned body; and processing, by a second convolutional neural network, the plurality of pseudo-RE images to classify one or more input images of the plurality of input images with respect to a specified medical diagnosis with respect to the scanned body.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Described herein are methods and systems for computed tomography (CT) image processing and data analysis.

CT imaging, positron emission tomography (PET) imaging, and PET-CT imaging are widely employed in medical diagnostics, e.g., for detecting tumors and other abnormal masses within living bodies. Cancerous cells consume the glucose much faster than healthy ones, thus producing the excessive energy which may be registered by the PET apparatus. On the other hand, multiple CT images taken from different angles may be utilized to produce cross-sectional slices of specific areas of the scanned object. Combination of PET images and CT images may be utilized to produce three-dimensional images of the tracer concentration within the body at the cellular level.

However, the prohibitively high cost of modern PET equipment makes its inaccessible for many patients. Furthermore, various other factors may hinder the wider utilization of PET and PET-CT imaging methods, e.g., a limited life shell of many positron-emitting radionuclides (tracers) that need to be introduced into the living body for PET imaging. Furthermore, the interpretation of PET and PET-CT results may only be performed by highly-qualified medical professionals, which may not be available in some health care facilities. In the modern medical practice, a PET or PET-CT image is initially processed by an imaging specialist who detects the regions of interest (ROIs), which are then analyzed by the attending physician. The two-stage processing may lead to delays in obtaining the diagnostic results and thus may adversely affect the patient treatment. Furthermore, PET image analysis may be hindered by the visual similarity of cancer masses and benign tumors.

Conversely, CT equipment is usually available in most modern health care facilities. However, the diagnostic accuracy of cancer based solely on CT scans may often be unsatisfactory.

The present disclosure overcomes the above-noted and other deficiencies by providing systems and methods for image processing and data analysis that may be utilized for medical diagnostics. In certain implementations, the systems and methods described herein may perform pixel-level analysis of images in order to yield diagnostically-significant ROIs. The systems and methods described herein may further determine whether the analyzed images contain regions that may be indicative of the presence of diagnostically-significant features, thus allowing the attending physician to determine whether a particular patient needs more complex and expensive tests (e.g., PET or PET-CT). While the systems and methods described herein do not involve the costly (e.g., PET or PET-CT) methods or radioactive tracers, the accuracy of the diagnostic results produced by the disclosed systems and methods is similar to the accuracy of various advanced diagnostic methods. While the example systems and methods described herein utilize CT images to produce pseudo-PET images, other implementations may utilize other imaging technologies, such as Single-Photon Emission Computed Tomography (SPECT), Magnetic Resonance Imaging (MRI), Phase Contrast Magnetic Resonance Imaging (PC-MRI), Magnetic Resonance Imaging Electroencephalography (MRI-EEG), contrast-enhanced CT, diffusion MRI, Diffusion Tensor Imaging (DTI), Diffusion weighted imaging (DWI), Magnetic Resonance Angiography (MRA), Magnetic Resonance Spectroscopy (MRS), and/or Functional Magnetic Resonance Imaging (fMRI). Thus, the systems and methods described herein may be applied to a wide variety of medical imaging-based diagnostic methods that may involve various combinations of multiple imaging and/or other medical tests.

The systems and methods described herein utilize a pair of convolutional neural networks (CNN), such that the first CNN processes CT images of a body to produce pseudo-RE images (e.g., pseudo-PET images), while the second CNN processes the pseudo-RE images to perform the CT image classification with respect to a certain presumed diagnosis.

In certain implementations, the second CNN may correlate the pseudo-RE images with the CT images in order to yield the probabilities of one or more CT images containing diagnostically-significant image features associated with the presumed diagnosis. By correlating the pseudo-RE images with the CT images, the second CNN may further yield one or more regions of interest (ROIs) within the CT images, such that each ROI contains diagnostically-significant image features associated the presumed diagnosis. While the example systems and methods described herein include particular examples of CNN structure and parameters, other implementations may utilize different CNN structure and/or parameters. Various aspects of the above referenced methods and systems are described in details herein below by way of examples, rather than by way of limitation.

A CNN is a computational model based on a multi-staged algorithm that applies a set of pre-defined functional transformations to a plurality of inputs (e.g., image pixels) and then utilized the transformed data to perform pattern recognition. A CNN may be implemented as a feed-forward artificial neural network in which the connectivity pattern between its neurons is inspired by the organization of the animal visual cortex. Individual cortical neurons respond to stimuli in a restricted region of space known as the receptive field. The receptive fields of different neurons partially overlap such that they tile the visual field. The response of an individual neuron to stimuli within its receptive field can be approximated mathematically by a convolution operation.

In an illustrative example, a CNN may include multiple layers of various types, including convolution layers, non-linear layers (e.g., implemented by rectified linear units (ReLUs)), pooling layers, and classification (fully-connected) layers. A convolution layer may extract features from the input image by applying one or more learnable pixel-level filters to the input image. In an illustrative example, a pixel-level filter may be represented by a matrix of integer values, which is convolved across the dimensions of the input image to compute dot products between the entries of the filter and the input image at each spatial position, thus producing a feature map that represents the responses of the filter at every spatial position of the input image. The convolution filters are defined at the network training stage based on the training dataset to detect patterns and regions that are indicative of the presence of diagnostically-significant features within the input image.

A non-linear operation may be applied to the feature map produces by the convolution layer. In an illustrative example, the non-linear operation may be represented by a rectified linear unit (ReLU) which replaces with zeros all negative pixel values in the feature map. In various other implementations, the non-linear operation may be represented by a hyperbolic tangent function, a sigmoid function, or by other suitable non-linear function.

A pooling layer may perform subsampling to produce a reduced resolution feature map while retaining the most relevant information. The subsampling may involve averaging and/or determining maximum value of groups of pixels.

In certain implementations, convolution, non-linear, and pooling layers may be applied to the input image multiple times prior to the results being transmitted to a classification (fully-connected) layer. Together these layers extract the useful features from the input image, introduce non-linearity, and reduce image resolution while making the features less sensitive to scaling, distortions, and small transformations of the input image.

The output from the convolutional and pooling layers represent high-level features of the input image. The purpose of the classification layer is to use these features for classifying the input image into various classes. In an illustrative example, the classification layer may be represented by an artificial neural network that comprises multiple neurons. Each neuron receives its input from other neurons or from an external source and produces an output by applying an activation function to the sum of weighted inputs and a trainable bias value. A neural network may include multiple neurons arranged in layers, including the input layer, one or more hidden layers, and the output layer. Neurons from adjacent layers are connected by weighted edges. The term "fully connected" implies that every neuron in the previous layer is connected to every neuron on the next layer.

The edge weights are defined at the network training stage based on the training dataset. In an illustrative example, all the edge weights are initialized to random values. For every input in the training dataset, the neural network is activated. The observed output of the neural network is compared with the desired output specified by the training data set, and the error is propagated back to the previous layers of the neural network, in which the weights are adjusted accordingly. This process is repeated until the output error is below a predetermined threshold.

Figure 1:
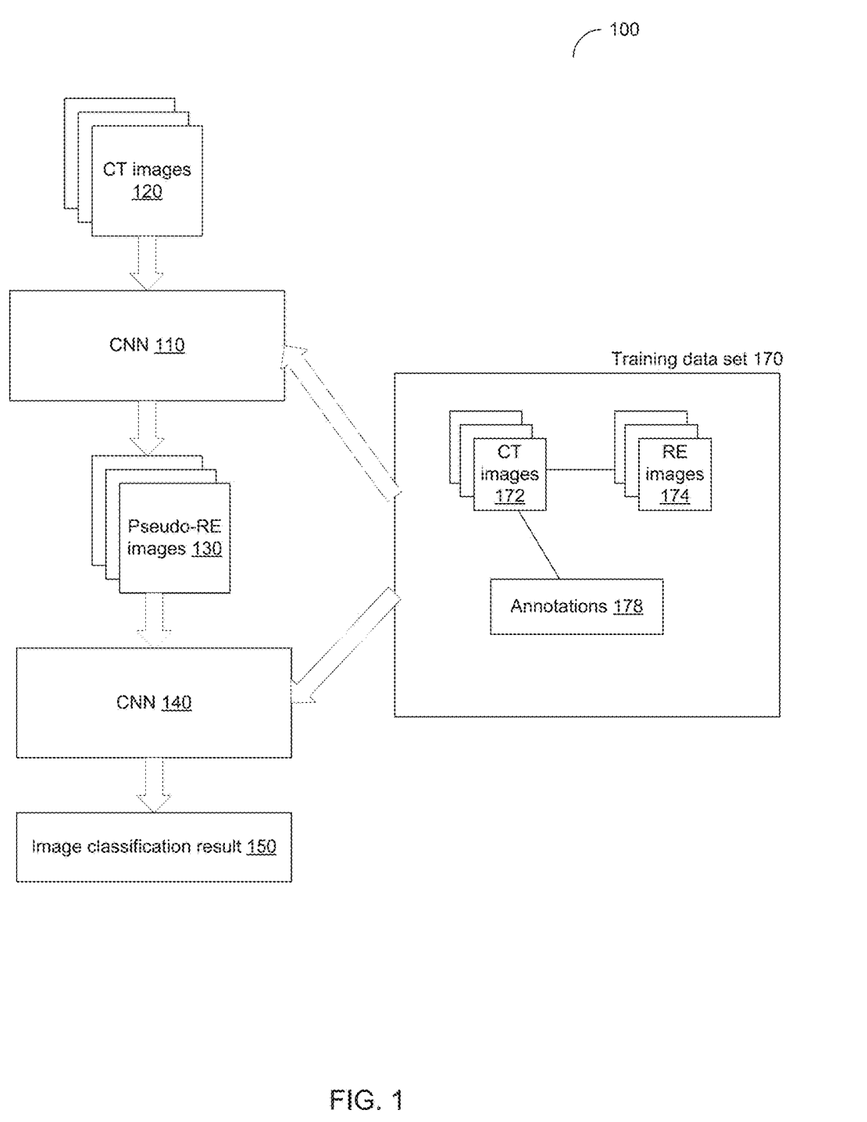
FIG. 1 schematically illustrates an example system for computed tomography (CT) image processing and data analysis, in accordance with one or more aspects of the present disclosure.

FIG. 1 schematically illustrates an example system 100 for CT image processing and data analysis in accordance with one or more aspects of the present disclosure. As schematically illustrated by FIG. 1, the first CNN 110 may be employed to processes a plurality of CT images 120 of a scanned body in order to produce pseudo-RE images 130. Pseudo-RE images, such as pseudo-PET images, emulate the radioactive tracer distribution within the scanned body at the cellular level and generally have lower resolution than corresponding CT images.

The pseudo-RE images 130 may be processed by the second CNN 140, which may yield image classification results 150 with respect to a certain presumed diagnosis. In an illustrative example, the second CNN 140 may correlate the pseudo-RE images with the CT images in order to yield the probabilities of one or more CT images 120 containing diagnostically-significant image features associated with the presumed diagnosis. By correlating the pseudo-RE images with the CT images, the second CNN 140 may further yield one or more regions of interest (ROIs) within the CT images 120, such that each ROI contains diagnostically-significant image features associated the presumed diagnosis.

The CNNs 110 and 140 may be pre-trained using a training data set 170 that contains imaging data of multiple (e.g., thousands) patients. For every patient, the training data set may include multiple pixel-level annotated CT slices 172 and corresponding PET images 174, such that the CT slices and the PET images are associated with the same part of the scanned body.

In certain implementations, training of the CNN 110 may involve activating the CNN 110 for every set of input CT images in the training dataset. The observed output (e.g., the pseudo-RE image produced by the CNN 110) is compared with the desired output (e.g., the RE image corresponding to the set of input CT images) specified by the training data set, the error is calculated, and the parameters of the CNN 110 are adjusted accordingly. This process is repeated until the output error is below a predetermined threshold.

In certain implementations, training of the CNN 140 may involve activating the CNN 140 for every set of RE images in the training dataset. The observed output (e.g., the probability of one or more input images of the plurality of input images comprising diagnostically-significant image features associated with the specified medical diagnosis with respect to the scanned body) is compared with the desired output (e.g., the pixel-level annotations of the set of input CT images corresponding to the RE image processed by the CNN 140) specified by the training data set, the error is calculated, and the parameters of the CNN 140 are adjusted accordingly. This process is repeated until the output error is below a predetermined threshold.

Figure 2:
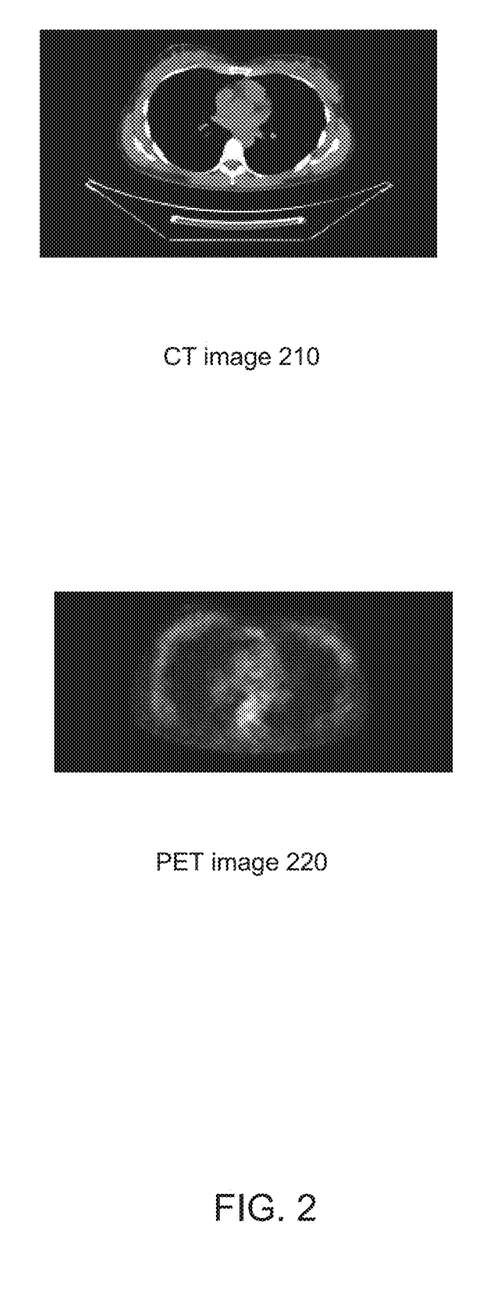
FIG. 2 schematically illustrates an example CT image and a corresponding positron emission tomography (PET) image of a scanned body, in accordance with one or more aspects of the present disclosure.
Figure 3:
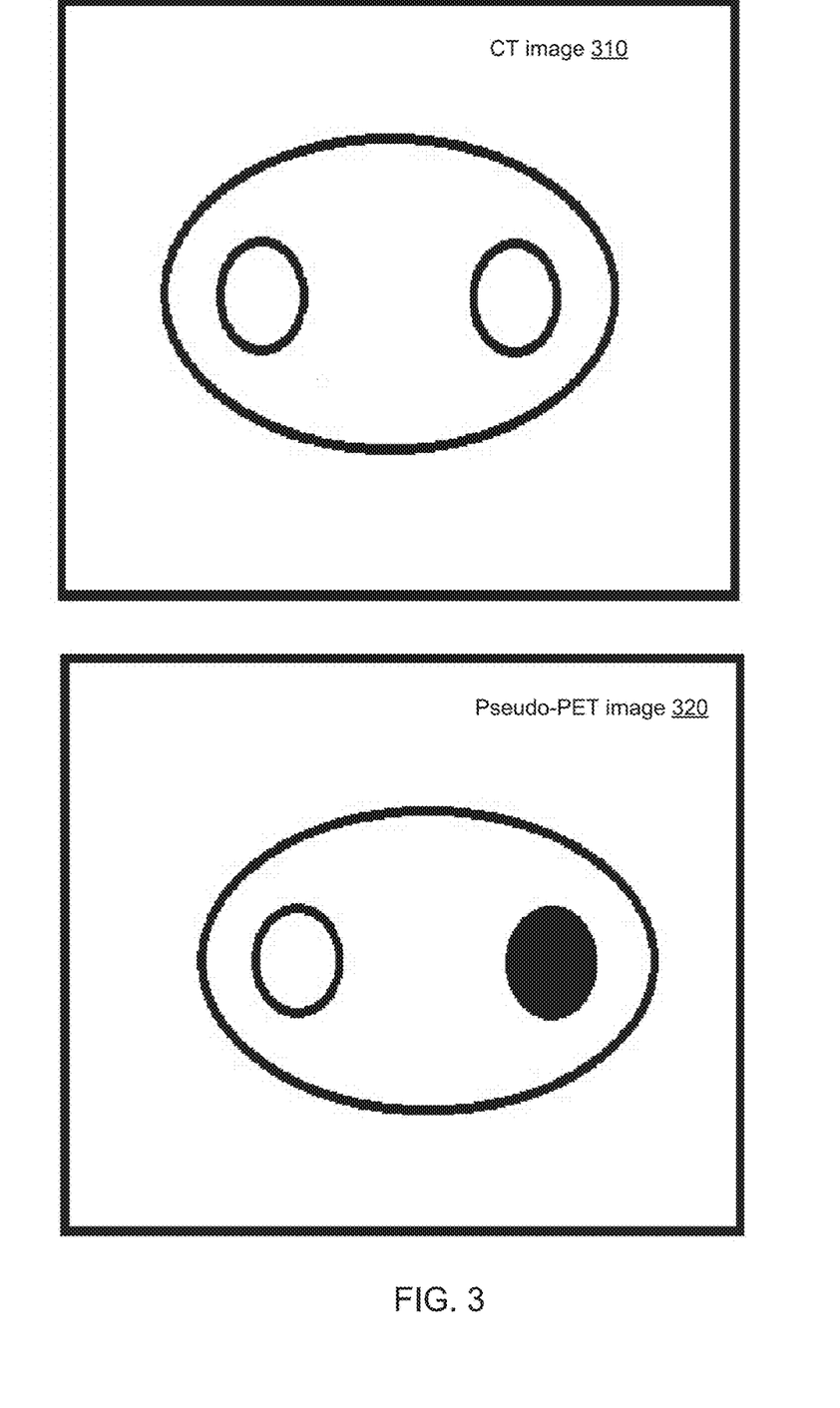
FIG. 3 schematically illustrates an example simplified CT image processed by a convolution neural network (CNN) in order to produce a corresponding pseudo-PET image, in accordance with one or more aspects of the present disclosure.

FIG. 2 schematically illustrates an example CT image 210 and a corresponding PET image 220 of a scanned body. The PET image 220 shows the radioactive tracer distribution within the scanned body at the cellular level and has a lower resolution than the corresponding CT image 210. FIG. 3 schematically illustrates an example simplified CT image 310 processed by the CNN 110 in order to produce a corresponding pseudo-PET image 320.

Referring again to FIG. 1, the pixel-level annotations 178 associated with CT slices 172 may be created by a medical professional based on the PET images and/or other diagnostic data. The pixel-level annotations may specify spatial locations of points or regions or interest (ROI) and associated clinical markers (e.g., tumors, bone fractures, blood clots, etc.). In an illustrative example, each patient data may comprise several hundred CT and PET images associated with the same part of the scanned body and having the respective resolutions of 512×512 pixels and 256×256 pixels.

In certain implementations, the images of the training data set may be pre-processed, e.g., by cropping, which may be performed in order to remove certain irrelevant parts of each frame. In an illustrative example, CT images having the resolution of 512×512 pixels may be cropped to remove 80-pixel wide image margins from each side of the rectangular image, while PET images having the resolution of 256×256 pixels may be cropped to remove 40-pixel wide image margins from each side of the rectangular image.

The training data set may be divided into two subsets, such that the first subset (e.g., 80% of the imaging data) is used for CNN training while the second subset (e.g., 20% of the imaging data) is used for CNN verification.

Training the CNNs 110 and 140 to yield a pseudo-RE image based on a series of CT images involves defining the convolution filters, adjusting the edge weights of the fully-connected layer, and/or determining other CNN parameters by processing series of subsequent CT slice images and associated pixel-level annotations of the training data set 170.

Figure 4:
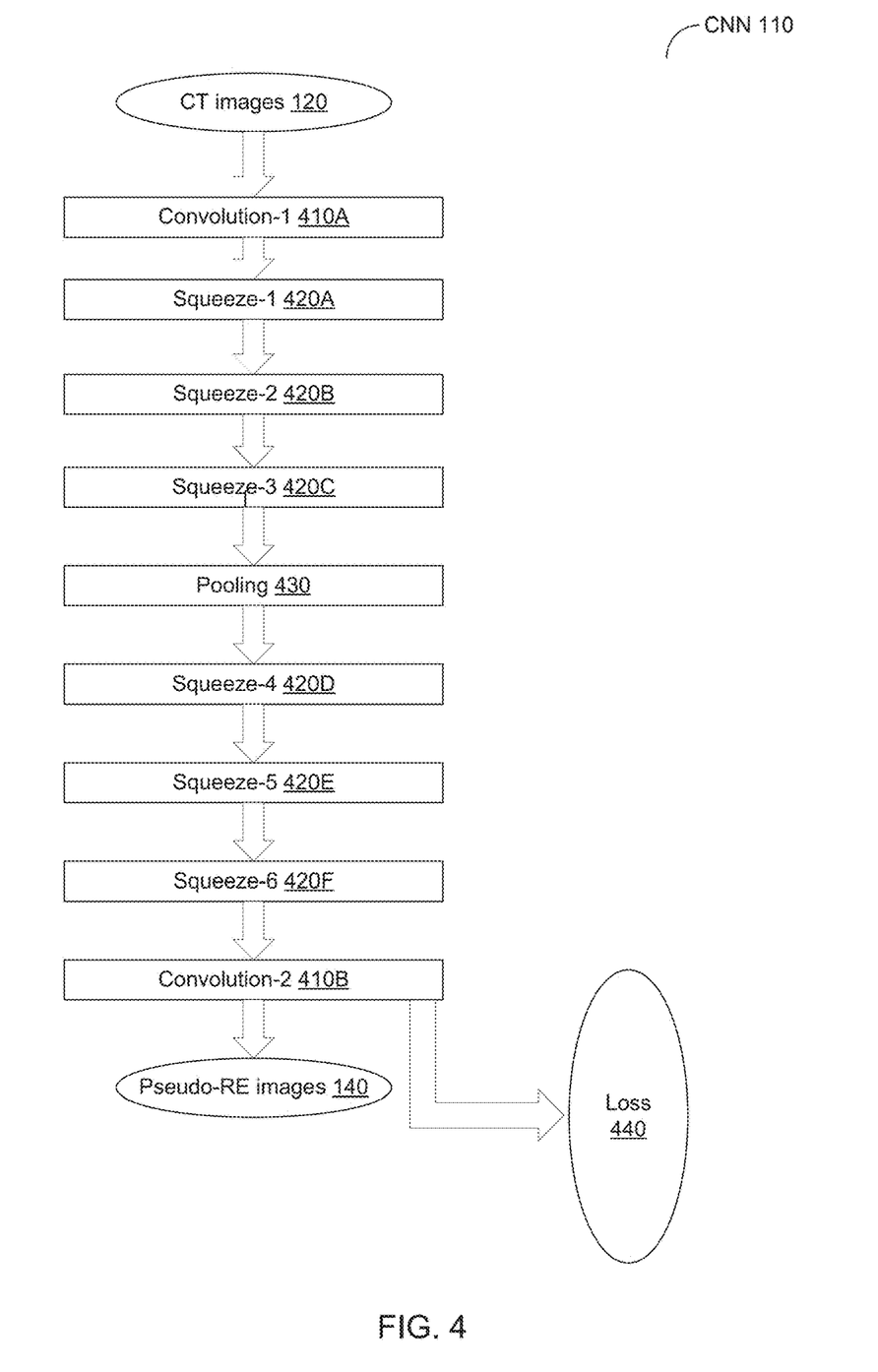
FIG. 4 schematically illustrates an example structure of a CNN that may be employed to processes a plurality of CT images of a scanned body in order to produce corresponding pseudo radioisotope emission (pseudo-RE) images, in accordance with one or more aspects of the present disclosure.

FIG. 4 schematically illustrates an example structure of a CNN 110 that may be employed to processes a plurality of CT images of a scanned body in order to produce corresponding pseudo-RE images, in accordance with one or more aspects of the present disclosure. In certain implementations, the acquired CT images may be pre-processed, e.g., by cropping, which may be performed in order to remove certain irrelevant parts of each frame. In an illustrative example, CT images having the resolution of 512×512 pixels may be cropped to remove 80-pixel wide image margins from each side of the rectangular image.

As schematically illustrated by FIG. 4, the CNN 110 may include a first convolution layer 410A that receives a plurality of input CT images 120. The first convolution layer 410A is followed by multiple squeeze layers 420A-420C and a pooling layer 430, which is in turn followed by multiple squeeze layers 420D-420F and a second convolution layer 410B. The second convolution layer 410B outputs a plurality of pseudo-RE images 130 corresponding to the input CT images 120 and further produces the loss value 440 reflecting the difference between the produced data and the training data set. In certain implementations, the loss value may be determined empirically or set at a pre-defined value (e.g., 0.1).

In certain implementations, the loss value is determined as follows:

$$loss = \Sigma(x-y)^2(\tfrac{1}{2}+\max(x,y)),$$

where x is the pixel value produced by the second convolution layer 410B and y is the value of the corresponding RE image pixel.

Each convolution layer 410 may extract features from a sequence of input CT images, by applying one or more learnable pixel-level filters to a three-dimensional matrix representing the sequence of input CT images. The pixel-level filter may be represented by a matrix of integer values, which is convolved across the dimensions of the input image to compute dot products between the entries of the filter and the input image at each spatial position, thus producing a feature map that represents the responses of the first convolution layer 410A at every spatial position of the input image. In an illustrative example, the first convolution layer 410A may include sixteen filters having the dimensions of 3×3×3. The second convolution layer may merge all the values produced by previous layers in order produce a matrix representing a plurality of pseudo-RE image pixels. In an illustrative example, the resulting matrix may have the dimensions of 88×88×25.

Figure 5:
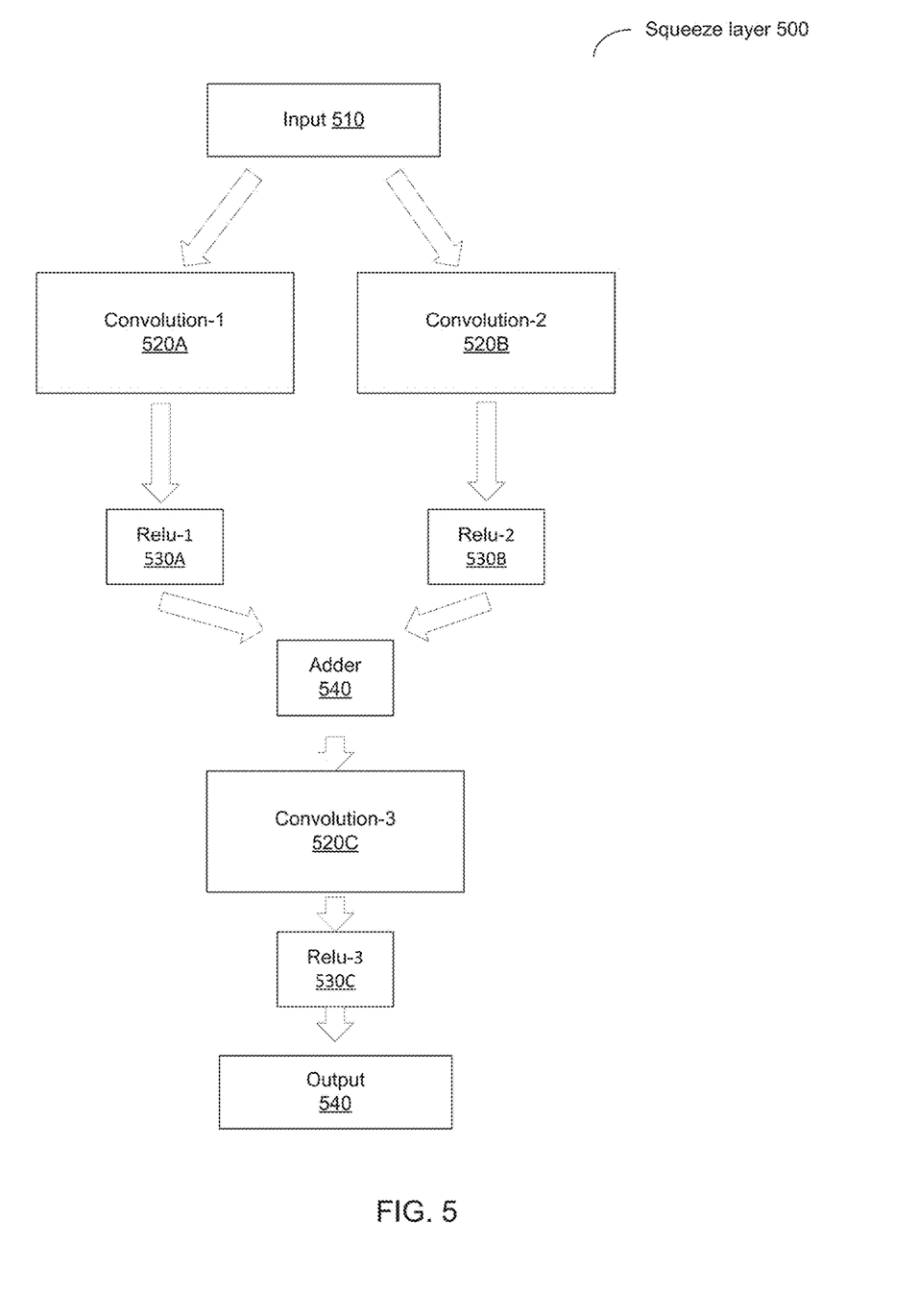
FIG. 5 schematically illustrates an example structure of squeeze layers of a first CNN implemented in accordance with one or more aspects of the present disclosure.

FIG. 5 schematically illustrates an example structure of squeeze layers 420A-420F of the CNN 110 implemented in accordance with one or more aspects of the present disclosure. As schematically illustrated by FIG. 5, a squeeze module 500 may feed the received output 510 to the parallel convolution layers 520A-520B, which are followed by respective ReLU layers 530A-530B. The outputs of ReLU layers 530A-530B are summed by the adder module 540 and fed to the third convolution layer 520C followed by the third ReLU layer 530C, which produces the output 540.

Figure 6:
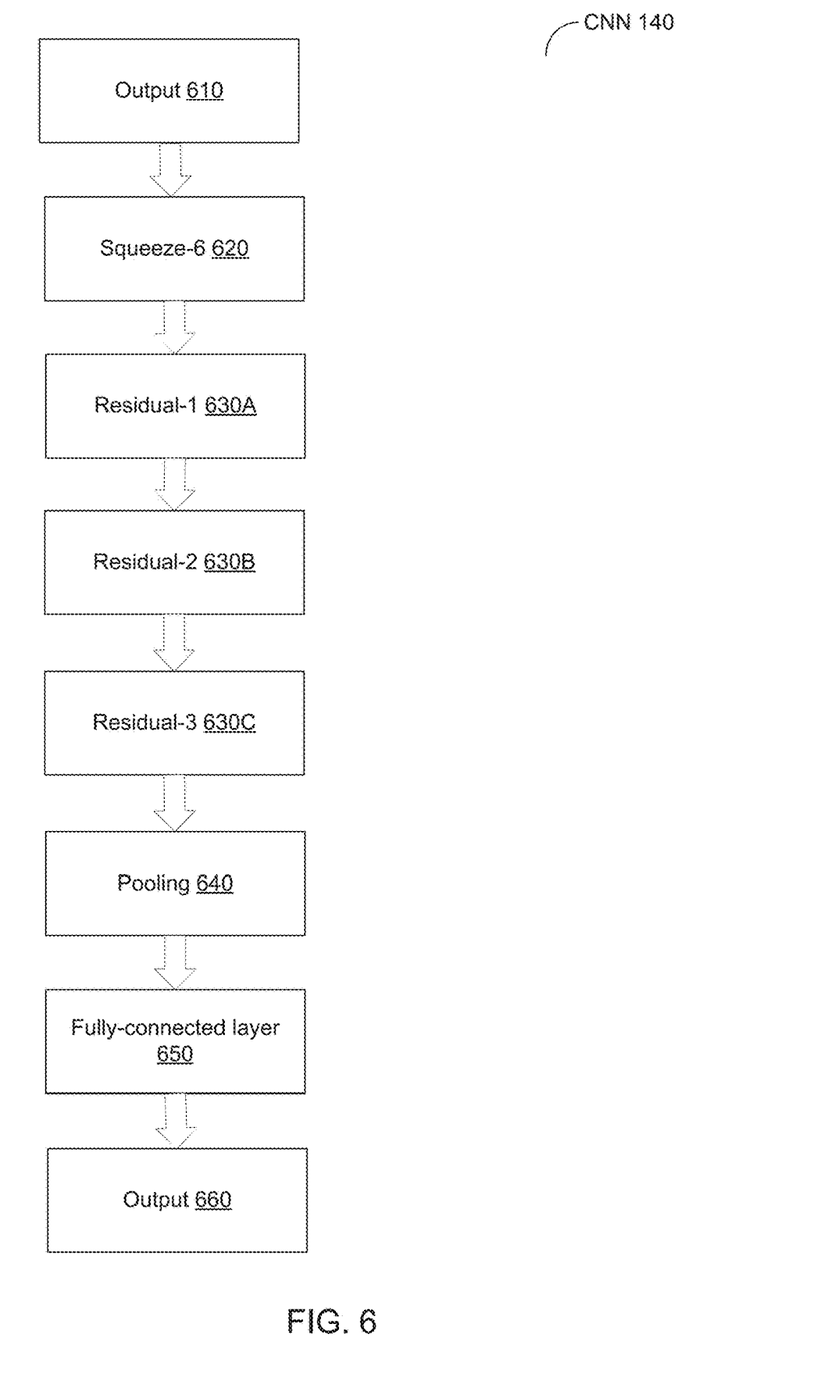
FIG. 6 schematically illustrates an example structure of a second CNN that may be employed to processes the pseudo-RE images yielded by the first CNN, in order to produce image classification of the input CT images with respect to a certain presumed diagnosis, in accordance with one or more aspects of the present disclosure.

FIG. 6 schematically illustrates an example structure of a CNN 140 that may be employed to processes the pseudo-RE images produced by the CNN 110 in order to produce image classification of the input CT images with respect to a certain presumed diagnosis, in accordance with one or more aspects of the present disclosure. As schematically illustrated by FIG. 6, the CNN 140 may include a squeeze layer 620 that receives a plurality of pseudo-RE images 610 produced by the CNN 110. The squeeze layer 620 is followed by multiple residual layers 630A-630C and a pooling layer 640, which is in turn followed by multiple residual layers 630D-630F and a fully-connected layer 650. The fully-connected layer 650 outputs the image classification of the input CT images with respect to a certain presumed diagnosis, in accordance with one or more aspects of the present disclosure. In an illustrative example, the CNN 140 may yield the probabilities of one or more CT images 120 containing diagnostically-significant image features associated with the presumed diagnosis. In another illustrative example, the second CNN 140 may yield one or more regions of interest (ROIs) 160 within the CT images 120, such that each ROI contains diagnostically-significant image features associated the presumed diagnosis.

In certain implementations, the probability of a CT image containing diagnostically-significant image features may be determined by the cross-entropy function, in which the error signal associated with the output layer is directly proportional to the difference between the desired and actual output values. The error margin may be pre-set to a specified value or adjusted based processing the verification subset of the training dataset.

In certain implementations, the error margin of the example system 100 to correctly classify one or more diagnostic images may be determined by utilizing a receiver operating characteristic (ROC) curve, which may be represented by a graphical plot that illustrates the system diagnostic ability as its error margin is varied. In an illustrative example, the ROC curve may be created by plotting the true positive rate (TPR) against the false positive rate (FPR) at various error margin settings. The true-positive rate is also known as sensitivity, recall or probability of detection. The false-positive rate is also known as the fall-out or probability of false alarm and can be calculated as (1−specificity). The ROC curve is thus the sensitivity as a function of fall-out. In certain implementations, the error margin value may be selected that reflects a desired ratio of true positive and false positive outcomes.

Figure 7:
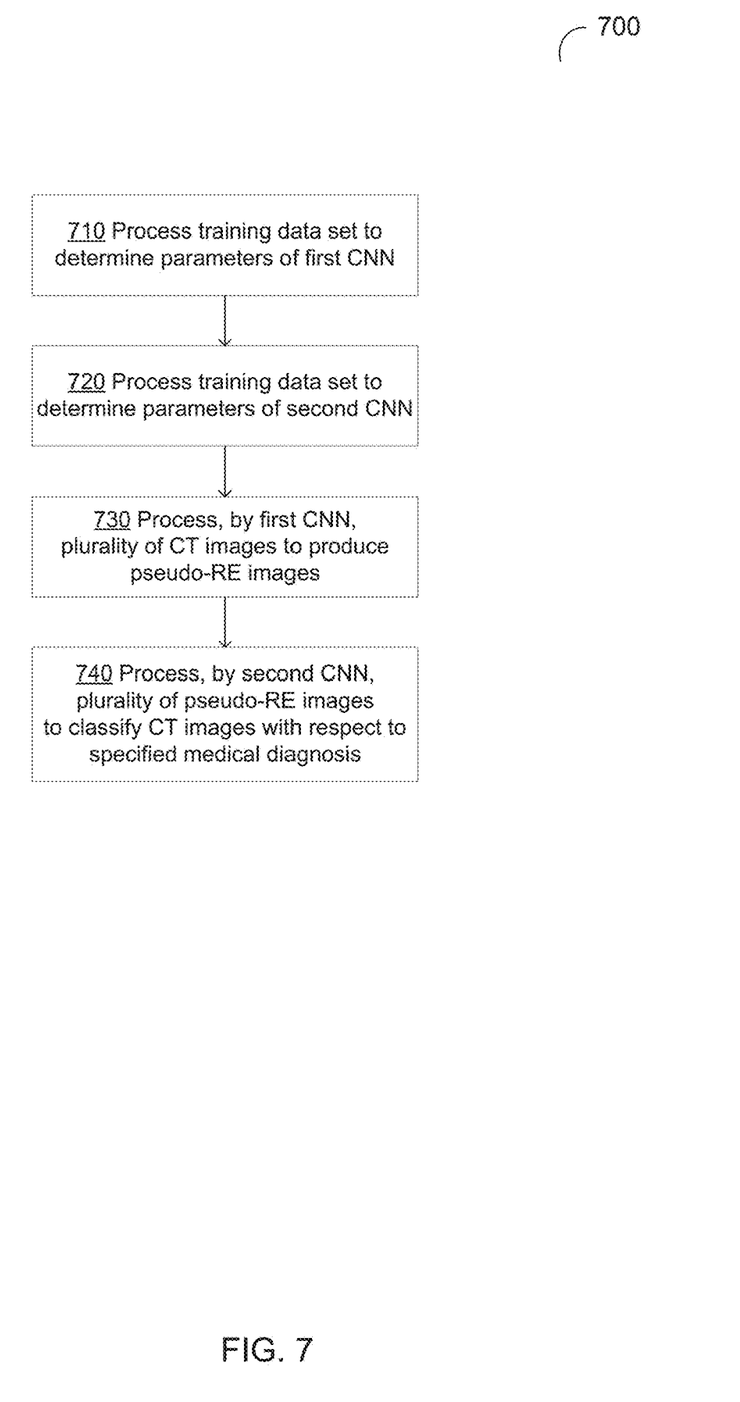
FIG. 7 depicts a flow diagram of one illustrative example of a method 700 of computed tomography image processing and data analysis, in accordance with one or more aspects of the present disclosure.

FIG. 7 depicts a flow diagram of one illustrative example of a method 700 of computed tomography image processing and data analysis, in accordance with one or more aspects of the present disclosure. Method 700 and/or each of its individual functions, routines, subroutines, or operations may be performed by one or more processors of the computer system (e.g., processing device 100 of FIG. 1) executing the method. In certain implementations, method 700 may be performed by a single processing thread. Alternatively, method 700 may be performed by two or more processing threads, each thread executing one or more individual functions, routines, subroutines, or operations of the method. In an illustrative example, the processing threads implementing method 700 may be synchronized (e.g., using semaphores, critical sections, and/or other thread synchronization mechanisms). Alternatively, the processing threads implementing method 700 may be executed asynchronously with respect to each other.

At block 710, the processing device performing the method may process a training data set comprising a first plurality of annotated input images and a second plurality of corresponding pseudo-RE images, in order to determine one or more parameters of a first CNN to be employed for processes a plurality of CT images of a scanned body in order to produce corresponding pseudo radioisotope emission (pseudo-RE) images. In various illustrative examples, the parameters of the first CNN may include the convolution filter values and/or the edge weights of the fully-connected layer.

In an illustrative example, the plurality of input images comprises one or more computed tomography (CT) images. In another illustrative example, the plurality of pseudo-RE images emulates Positron Emission Tomography (PET) images. The plurality of pseudo-RE images may illustrates an emulated radioactive tracer distribution within the scanned body. In certain implementations, the pixel resolution of an input image of the plurality of input images may exceeds the pixel resolution of a pseudo-RE image of the plurality of pseudo-RE images, as described in more detail herein above.

At block 720, the processing device may process the training data set, in order to determine one or more parameters of the second convolutional neural network to be employed for processing the pseudo-RE images yielded by the first CNN, in order to produce image classification of the input CT images with respect to a certain presumed diagnosis. In various illustrative examples, the parameters of the first CNN may include the convolution filter values and/or the edge weights of the fully-connected layer, as described in more detail herein above.

At block 730, the processing device may process, by the first convolutional neural network, a plurality of input images of a scanned body to produce one or more pseudo radioisotope emission (pseudo-RE) images of the scanned body, as described in more detail herein above.

At block 740, the processing device may process, by the second convolutional neural network, the plurality of pseudo-RE images to classify one or more input images of the plurality of input images with respect to a specified medical diagnosis with respect to the scanned body. In an illustrative example, processing the plurality of pseudo-RE images yields a probability of one or more input images of the plurality of input images comprising diagnostically-significant image features associated with the specified medical diagnosis with respect to the scanned body. The probability of the input images comprising the diagnostically-significant image features may be determined by a cross-entropy function, the error signal of which is directly proportional to a difference between desired and actual output values.

In another illustrative example, processing the plurality of pseudo-RE images yields one or more regions of interest (ROIs) within one or more input images of the plurality of input images, wherein each ROI comprises diagnostically-significant image features associated with the specified medical diagnosis with respect to the scanned body, as described in more detail herein above.

In another illustrative example, processing the plurality of pseudo-RE images yields one or more annotated images, wherein each annotated image is associated with a corresponding input image of the plurality of input images. The pixel-level annotations may specify spatial locations of points or regions or interest (ROI) and associated clinical markers (e.g., tumors, bone fractures, blood clots, etc.).

Figure 8:
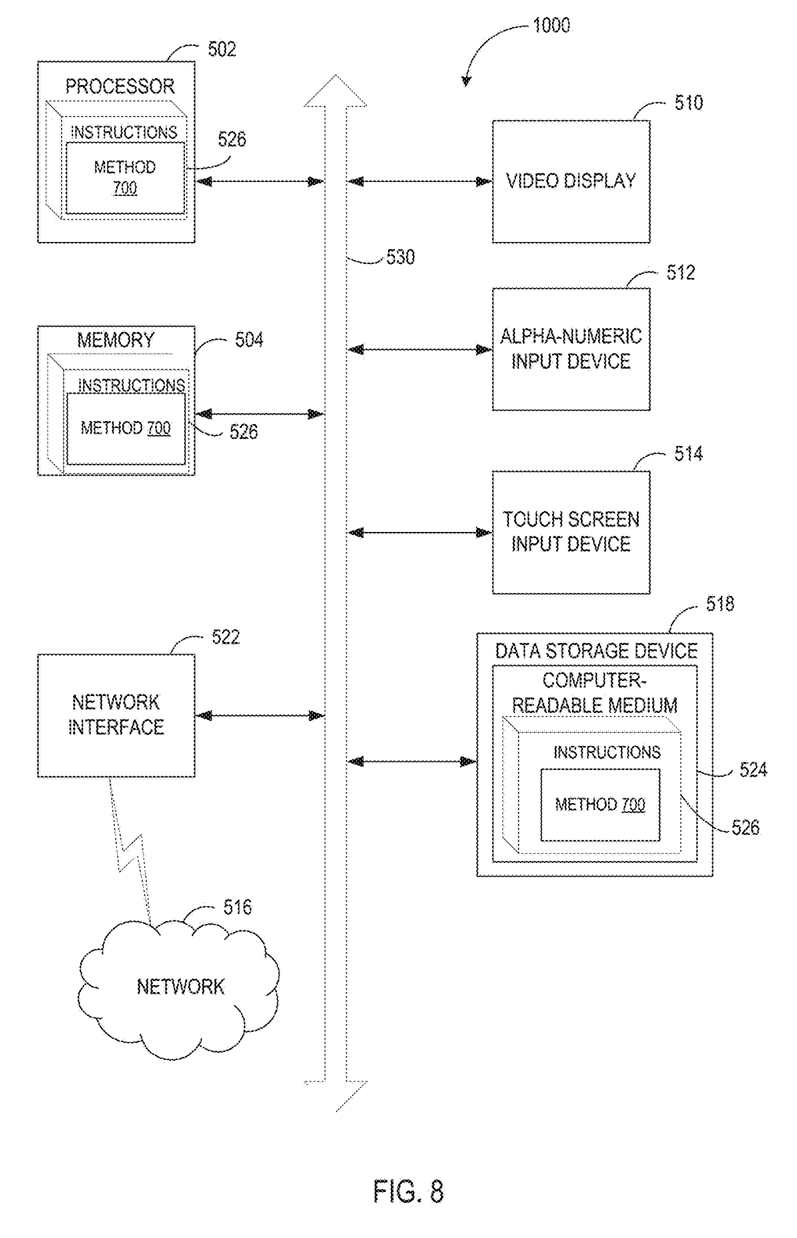
FIG. 8 depicts a diagram of an illustrative example of a computing device implementing the systems and methods described herein.

FIG. 8 illustrates an example computing device 1000 within which a set of instructions, for causing the computing device to perform any one or more of the methods discussed herein, may be executed. The computing device 1000 may be connected to other computing device in a LAN, an intranet, an extranet, or the Internet. The computing device 1000 may operate in the capacity of a server or a client computing device in a client-server network environment, a server or a client computing device in a cloud environment, or as a peer computing device in a peer-to-peer (or distributed) network environment. The computing device 1000 may be a provided by a personal computer (PC), a tablet PC, a set-top box (STB), a Personal Digital Assistant (PDA), a cellular telephone, or any computing device capable of executing a set of instructions (sequential or otherwise) that specify operations to be performed by that computing device. Further, while only a single computing device is illustrated, the term "computing device" shall also be taken to include any collection of computing devices that individually or jointly execute a set (or multiple sets) of instructions to perform any one or more of the methodologies discussed herein.

Exemplary computing device 1000 includes a processor 502, a main memory 504 (e.g., read-only memory (ROM) or dynamic random access memory (DRAM)), and a data storage device 518, which communicate with each other via a bus 530.

Processor 502 may be represented by one or more general-purpose processing devices such as a microprocessor, central processing unit, or the like. More particularly, processor 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. Processor 502 may also be one or more special-purpose processing devices such as an application specific integrated circuit (ASIC), a field programmable gate array (FPGA), a digital signal processor (DSP), network processor, or the like. Processor 502 is configured to execute instructions 526 for performing the operations and functions discussed herein.

Computing device 1000 may further include a network interface device 522, a video display unit 510, a character input device 512 (e.g., a keyboard), and a touch screen input device 514.

Data storage device 518 may include a computer-readable storage medium 524 on which is stored one or more sets of instructions 526 embodying any one or more of the methodologies or functions described herein. Instructions 526 may also reside, completely or at least partially, within main memory 504 and/or within processor 502 during execution thereof by computing device 1000, main memory 504 and processor 502 also constituting computer-readable storage media. Instructions 526 may further be transmitted or received over network 516 via network interface device 522.

In certain implementations, instructions 526 may include instructions of method 500 of computed tomography image processing and data analysis. While computer-readable storage medium 524 is shown in the example of FIG. 4 to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and software components, or only in software.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "determining", "computing", "calculating", "obtaining", "identifying," "modifying" or the like, refer to the actions and processes of a computing device, or similar electronic computing device, that manipulates and transforms data represented as physical (e.g., electronic) quantities within the computing device's registers and memories into other data similarly represented as physical quantities within the computing device memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

It is to be understood that the above description is intended to be illustrative, and not restrictive. Various other implementations will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
    receiving a plurality of input images of a scanned body;
    processing, by a first convolutional neural network, the plurality of input images to produce one or more pseudo radioisotope emission (pseudo-RE) images of the scanned body, wherein the pseudo-RE images emulate radioactive tracer distribution within the scanned body at a cellular level;
    processing, by a second convolutional neural network, the plurality of pseudo-RE images to classify one or more input images of the plurality of input images with respect to a specified medical diagnosis with respect to the scanned body; and
    determining an error margin associated with classifying one or more input images, wherein the error margin reflects a ratio of true positive and false positive outcomes.

2. The method of claim 1, wherein processing the plurality of pseudo-RE images yields a probability of one or more input images of the plurality of input images comprising diagnostically-significant image features associated with the specified medical diagnosis with respect to the scanned body.

3. The method of claim 2, wherein the probability of the input images comprising the diagnostically-significant image features is determined by a cross-entropy function.

4. The method of claim 3, wherein an error signal of the cross-entropy function associated with a second convolution neural network is proportional to a difference between desired and actual output values.

5. The method of claim 1, wherein processing the plurality of pseudo-RE images yields one or more regions of interest (ROIs) within one or more input images of the plurality of input images, wherein each ROI comprises diagnostically-significant image features associated with the specified medical diagnosis with respect to the scanned body.

6. The method of claim 1, wherein processing the plurality of pseudo-RE images yields one or more annotated images, wherein each annotated image is associated with a corresponding input image of the plurality of input images.

7. The method of claim 1, further comprising:
    processing a training data set comprising a first plurality of annotated input images and a second plurality of corresponding RE images to determine one or more parameters of at least one of: the first convolutional neural network or the second convolutional neural network.

8. The method of claim 7, wherein processing the training data set further comprises at least one of: cropping one or more input images of the plurality of input images or cropping one or more RE images of the plurality of RE images.

9. The method of claim 7, wherein a first pixel resolution of an annotated input image of the plurality of annotated input images exceeds a second pixel resolution of a corresponding RE image.

10. The method of claim 1, wherein a first pixel resolution of an input image of the plurality of input images exceeds a second pixel resolution of a pseudo-RE image of the plurality of pseudo-RE images.

11. The method of claim 1, wherein the plurality of input images comprises one or more computed tomography (CT) images.

12. The method of claim 1, wherein the plurality of pseudo-RE images emulate Positron Emission Tomography (PET) images.

13. A system, comprising:
    a memory;
    a processor, coupled to the memory, the processor configured to:
        receive a plurality of input images of a scanned body;
        process, by a first convolutional neural network, a plurality of input images of a scanned body to produce one or more pseudo radioisotope emission (pseudo-RE) images of the scanned body, wherein the pseudo-RE images emulate radioactive tracer distribution within the scanned body at a cellular level;
        process, by a second convolutional neural network, the plurality of pseudo-RE images to classify one or more input images of the plurality of input images with respect to a specified medical diagnosis with respect to the scanned body; and
        determine an error margin associated with classifying one or more input images, wherein the error margin reflects a ratio of true positive and false positive outcomes.

14. The system of claim 13, wherein processing the plurality of pseudo-RE images yields a probability of one or more input images of the plurality of input images comprising diagnostically-significant image features associated with the specified medical diagnosis with respect to the scanned body.

15. The system of claim 13, wherein processing the plurality of pseudo-RE images yields one or more regions of interest (ROIs) within one or more input images of the plurality of input images, wherein each ROI comprises diagnostically-significant image features associated with the specified medical with respect to the scanned body.

16. The system of claim 13, wherein the processor is further configured to:
processing a training data set comprising a first plurality of annotated input images and a second plurality of corresponding RE images to determine one or more parameters of at least one of: the first convolutional neural network or the second convolutional neural network.

17. The method of claim 16, wherein processing the training data set further comprises at least one of: cropping one or more input images of the plurality of input images or cropping one or more RE images of the plurality of RE images.

18. The system of claim 13, wherein a first pixel resolution of an input image of the plurality of input images exceeds a second pixel resolution of a pseudo-RE image of the plurality of pseudo-RE images.

19. The system of claim 13, wherein the plurality of input images comprises one or more computed tomography (CT) images.

20. The system of claim 13, wherein the plurality of pseudo-RE images emulate Positron Emission Tomography (PET) images.

21. A computer-readable non-transitory storage medium comprising executable instructions that, when executed by a computing device, cause the computing device to perform operations comprising:

receiving a plurality of input images of a scanned body;

processing, by a first convolutional neural network, a plurality of input images of a scanned body to produce one or more pseudo radioisotope emission (pseudo-RE) images of the scanned body, wherein the pseudo-RE images emulate radioactive tracer distribution within the scanned body at a cellular level; and processing, by a second convolutional neural network, the plurality of pseudo-RE images to yield a probability of one or more input images of the plurality of input images comprising diagnostically-significant image features associated with a specified medical diagnosis with respect to the scanned body, wherein the probability of the input images comprising the diagnostically-significant image features is determined by a cross-entropy function, and wherein an error signal of the cross-entropy function network is proportional to a difference between expected and actual output values.

22. The computer-readable non-transitory storage medium of claim 21, wherein processing the plurality of pseudo-RE images yields a probability of one or more input images of the plurality of input images comprising diagnostically-significant image features associated with the specified medical diagnosis with respect to the scanned body.

* * * * *